United States Patent [19]

Ungefug et al.

[11] Patent Number: 5,703,176
[45] Date of Patent: Dec. 30, 1997

[54] POLYACRYLATE THICKENER AND METHOD FOR MAKING SAME

[75] Inventors: Gary Allan Ungefug, Simpsonville; Benjamin Marvin Wicker, Ware Shoals; James Richard Bible, Fountain Inn, all of S.C.; Billy Thomas Worley, Jr., Dalton, Ga.

[73] Assignee: Para-Chem Southern, Inc., Simpsonville, S.C.

[21] Appl. No.: 620,852

[22] Filed: Mar. 18, 1996

[51] Int. Cl.⁶ ............................................. C08F 8/42
[52] U.S. Cl. .................................. 525/369; 525/330.6
[58] Field of Search ............................................. 525/369

[56] References Cited

U.S. PATENT DOCUMENTS

| | | |
|---|---|---|
| 3,652,497 | 3/1972 | Arlington et al. |
| 3,657,175 | 4/1972 | Zimmerman. |
| 3,891,591 | 6/1975 | Chang et al. |
| 3,894,980 | 7/1975 | DeTommaso. |
| 3,970,626 | 7/1976 | Hurst et al. .......................... 525/369 |
| 4,077,926 | 3/1978 | Sanderson et al. |
| 4,138,381 | 2/1979 | Chang et al. |
| 4,384,096 | 5/1983 | Sonnabend. |

*Primary Examiner*—Bernard Lipman
*Attorney, Agent, or Firm*—Dority & Manning, P.A.

[57] ABSTRACT

An improved polyacrylate thickener and a method for making same are provided. The polyacrylate thickener is made using a monomer blend containing ethyl acrylate. In one embodiment the ethyl acrylate is polymerized and then hydrolyzed using a metal hydroxide. The resulting thickener contains unhydrolyzed polyacrylates, metal polyacrylates and ethanol. The final product, which is nontoxic and nonhazardous, can then be added to other compositions, such as textile coatings, as a viscosity enhancer.

15 Claims, No Drawings

POLYACRYLATE THICKENER AND METHOD FOR MAKING SAME

BACKGROUND OF THE INVENTION

The present invention generally relates to polyacrylate thickeners and to methods of making the thickeners. More particularly, the present invention is directed to a coating composition containing a polyacrylate thickener made from an ethyl acrylate monomer.

Broadly speaking, a thickener or thickening agent refers to an additive that is added to a composition in order to increase its viscosity or to otherwise alter its pour characteristics. One class of thickeners, polyacrylate thickeners, are used in a variety of different applications. For instance, polyacrylate thickeners have been found to be particularly well suited for use in adhesive coatings containing polymeric latex compositions. Such coatings are commonly used in the textile field.

For example, sodium polyacrylate is used as a thickener in carpet coatings of the type that are applied to the back of carpets for securing the carpet fibers to a base material. When used in these types of coatings, the sodium polyacrylate not only adjusts the viscosity of the coating to a desired level but also facilitates application of the coating to the textile product.

Currently, sodium polyacrylates are made by first polymerizing methyl acrylate to form a polymethylacrylate. The polymethylacrylate is then hydrolyzed using sodium hydroxide to produce a sodium polyacrylate. Unfortunately, during hydrolysis, methyl alcohol or methanol is also formed which remains in the thickener.

Methanol is flammable, poisonous, and is considered a hazardous substance. As such, methanol containing compositions are highly regulated and are subject to government reporting requirements. When using a methyl acrylate monomer to form a polyacrylate thickener, not only is the thickening agent subject to such government regulations but also any products or coatings that incorporate the thickener.

Further, when polyacrylate thickeners are incorporated into a textile coating and used, the coating is typically first whipped into a foam and then applied to a textile substrate. The methanol contained within the coating evaporates during application. Consequently, it is recommended that the coating only be applied in well ventilated areas and under careful monitored conditions.

Due to the above-concerns, a need exists for a polyacrylate thickener that does not contain substantial amounts of methanol and that is not considered hazardous or subject to governmental scrutiny. Also, a need exists for a polyacrylate thickener that does not release substantial amounts of methanol vapors during use.

SUMMARY OF THE INVENTION

The present invention recognizes and addresses the foregoing disadvantages, and others of prior art constructions and methods.

Accordingly, it is an object of the present invention to provide an improved polyacrylate thickener for use in textile coatings and other applications.

Still another object of the present invention is to provide a method of making a polyacrylate thickener that does not contain relatively large amounts of methanol in the final product.

Another object of the present invention is to provide a method of making an improved polyacrylate thickener from an ethyl acrylate monomer.

It is another object of the present invention to provide a method of making a polyacrylate thickener using ethyl acrylate that, unexpectedly, has improved properties over prior art thickeners.

Another object of the present invention is to provide a textile coating composition containing a polyacrylate thickener derived from an ethyl acrylate monomer.

These and other objects of the present invention are achieved by providing a method of preparing polyacrylate thickeners. The method includes the steps of polymerizing at least one acrylate ester monomer in an aqueous emulsion. In particular, the acrylate ester monomer blend includes at least ethyl acrylate. When polymerized, the ethyl acrylate is converted to a poly (ethyl acrylate).

Next, at least a portion of the poly (ethyl acrylate) is hydrolyzed using a metal hydroxide to form a thickener composition. The poly (ethyl acrylate) is converted to a metal polyacrylate and ethyl alcohol.

The aqueous emulsion containing the acrylate ester monomer can include a polymerization initiator, such as a persulfate, an acid stabilizer, such as acrylic acid, and various nonionic and anionic surfactants. During polymerization, preferably the aqueous emulsion is maintained at a temperature between about 160° F. to about 195° F. Once a majority of the ethyl acrylate is polymerized, a finishing initiator, preferably ammonium persulfate, is added to the aqueous emulsion.

After polymerization, from at least about 50% to about 100% of the poly (ethyl acrylate) is hydrolyzed using the metal hydroxide. The metal hydroxide can be sodium hydroxide, lithium hydroxide, or potassium hydroxide. During hydrolysis, preferably the mixture is maintained at a temperature between about 170° F. to about 200° F.

The amount of water added during the entire process should yield a polyacrylate product having a solids content from about 5% to about 20%.

These and other objects are also achieved by providing a coating composition for textiles. The coating composition includes a latex polymer, a filler and a polyacrylate thickener. The polyacrylate thickener is derived from an ethyl acrylate monomer and contains a mixture of a poly (ethyl acrylate) and a metal polyacrylate. The coating composition can also include nonionic and anionic surfactants and water.

In one embodiment, the filler can contain calcium carbonate and can be present in the composition in an amount up to about 90% by weight. Other fillers include clay, dolomite, aluminum trihydrate, magnesium carbonate and mixtures thereof. The latex polymer, on the other hand, can be styrene butadiene, ethylene vinyl acetate, an acrylic, a styrene acrylic, a vinyl acrylic, a vinyl acetate, a natural rubber, a neoprene rubber, or mixtures thereof and can be present in the composition in an amount up to about 95% by weight. Water can be present in the composition in an amount such that the composition has a solids content of from about 75% to about 85%.

Other objects, features and aspects of the present invention are discussed in greater detail below.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a method of making polyacrylate thickeners, particularly, a sodium polyacrylate thickener that contains no methanol or only minor amounts of methanol. As described above, in the past, sodium polyacrylate thickeners have been prepared by polymerizing a methyl acrylate monomer, followed by hydrolysis using sodium hydroxide. During hydrolysis, methanol is produced which remains in solution in the final product mixture. Because methanol is considered a hazardous substance, the final product is not only subject to government reporting requirements but must be used under controlled conditions.

In the process of the present invention, on the other hand, instead of using primarily a methyl acrylate monomer, an ethyl acrylate monomer is used to form the polyacrylate. When using ethyl acrylate, instead of creating methanol, ethyl alcohol is produced. Unlike methanol, ethyl alcohol is not considered a hazardous substance and is relatively safe to use.

Prior to any testing, it was believed that a polyacrylate thickener made from either a methyl acrylate monomer or an ethyl acrylate monomer would perform essentially the same. Most unexpectedly, however, it was discovered that thickeners made using ethyl acrylate have increased thickening properties and also have increased froth viscosities when foamed. Because of the increased thickening efficiency of the thickeners made from ethyl acrylate, a lesser amount of thickener is required to be added to coating compositions in order to reach a target viscosity. Further, the increased froth viscosity of the thickener allows for better control of coating weight. It is also believed that the improved thickener ultimately provides higher delamination strength values for coatings containing the thickener because it allows more accurate placement of the coating.

One preferred embodiment of producing an improved polyacrylate thickener according to the present invention will now be described in detail. In general, first an acrylic monomer blend containing ethyl acrylate is combined with water to form an emulsion and polymerized to form a polyacrylate. The polyacrylate is then hydrolyzed with a metal hydroxide to yield a metal polyacrylate and ethyl alcohol. The resulting composition can then be added to textile coatings and other similar products as a thickening agent.

More particularly, suitable monomer blends are chosen that can be polymerized into corresponding polyacrylates. Primarily such blends contain ethyl acrylate. However, other acrylate esters may also be included. By way of example, and without limitation, butyl acrylate, ethyl methacrylate, isobutyl acrylate, 2-ethylhexyl acrylate, amino acrylates, hydroxyethyl methacrylate, hydroxypropyl methacrylate, or other alkyl acrylates may be added. Further, even methyl acrylate may be incorporated into the monomer blend in minor amounts. Although methyl acrylate will form methanol later in the process, minor amounts can be used if desired.

The monomer blend is then combined with a polymerization initiator and water to form an emulsion. The mixture is heated to a temperature sufficient to cause the initiator to initiate polymerization of the monomer. Generally, polymerization is time and temperature dependant. In one embodiment, optimal temperatures for initiating polymerization have been found to be about 170° F. to about 195° F., and preferably around 180° F. at atmospheric pressure. At lower temperatures, although polymerization will occur, the reaction will proceed at a much slower rate. At higher temperatures, the monomer may tend to boil and vaporize and, thus, not undergo polymerization. Consequently, the temperature should be maintained below the boiling point of the monomers present within the blend. If the polymerization reaction occurs under pressurized conditions higher temperatures may be employed.

The initiator added to the monomer blend for initiating polymerization is preferably a persulfate, such as potassium persulfate, sodium persulfate, ammonium persulfate, or mixtures thereof. Of the persulfates available, potassium persulfate is perhaps the most preferred initiator since it is more stable at higher temperatures. Only small amounts of the initiator need to be added for the reaction to take place. Too much initiator added to the monomer may cause the resulting polymer to have a low molecular weight and thus a lower viscosity.

As described above, the initiator and monomer blend are combined with water to form an emulsion. The actual amount of water mixed with the monomer should be sufficient for an emulsion to form but is generally not critical. The amount of water added is generally dependent on the desired solids content of the resulting thickener.

Besides water and an initiator, one or more surfactants may also be added. The surfactants will facilitate the mixing of the monomers with the other ingredients resulting in a more homogeneous composition. It is believed that a wide variety of surfactants may be used within the process. Particularly well suited surfactants include nonionic and anionic surfactants. Examples of surfactants that may be used in the process of the present invention include polyoxyethylene phosphates and alkyl phenol ethoxylates with 3 to 50 moles of ethylene oxide.

In a preferred embodiment, ABEX 22-S anionic surfactant obtained from RHONE-POULENC and IGEPAL CO-997 nonionic surfactant (a nonylphenol ethoxylate) also obtained from RHONE-POULENC are incorporated into the emulsion.

In another alternative embodiment of the present invention, a stabilizer may be mixed with the monomer blend or otherwise added to the aqueous emulsion. For instance, preferably methacrylic acid or acrylic acid may be mixed with the monomer in small quantities. Other stabilizers may include itaconic acid, maleic acid, fumaric acid and other alkyl acrylic acids. The acid stabilizer will further stabilize the aqueous emulsion once polymerization occurs.

The acrylate ester monomer undergoes the following polymerization reaction (the brackets refer to the repeating unit that forms the polymer chain):

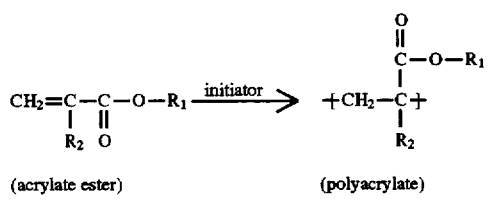

(acrylate ester)      (polyacrylate)

wherein $R_1$ is $C_nH_{2n+1}$ (n=1,2,3,4 ...) and $R_2$ is H or $CH_3$.

As shown, the acrylate ester forms a polyacrylate. When using an ethyl acrylate monomer, the above reaction is as follows:

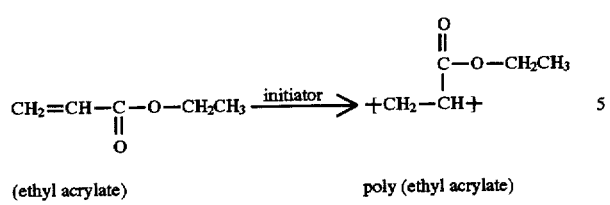

(ethyl acrylate)      poly (ethyl acrylate)

The above-diagrammed polymerization reactions are exothermic in nature. Consequently, the temperature of the reactor vessel should be monitored during formation of the polymer. As discussed above, the temperature of the reactor should not exceed the boiling point of the monomer. In order to keep the temperature at a constant level, the heat generated during the reaction should be removed from the reactor. This can be done, for instance, by using a reactor equipped with a cooling jacket through which a cooling fluid may be circulated. Also, the monomer blend may be fed to the reactor and mixed with the initiator and water at a slow rate to control temperature fluctuations. Preferably, the temperature within the reactor is maintained at about 180° F. until polymerization is complete.

Once polymer formation begins to slow, additional finishing initiator can be added to the emulsion if desired in order to polymerize any unreacted monomer. Here, the initiator used is preferably ammonium persulfate because, although not as temperature stable as potassium persulfate, ammonium persulfate is more reactive. Ideally, 100% of the monomer that is added to the emulsion is polymerized into a polyacrylate.

Once the polymer (including poly (ethyl acrylate)) is formed, the polymer is hydrolyzed using a metal hydroxide. In particular, the polyacrylates are converted into a corresponding metal polyacrylate and a corresponding alcohol. The reactions that occur during hydrolysis for a polyacrylate and specifically for poly (ethyl acrylate) are as follows:

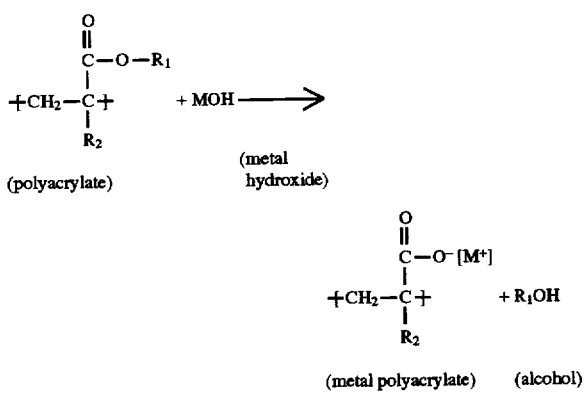

wherein $R_1$ is $C_nH_{2n+1}$ (n=1, 2, 3, 4 ...) and $R_2$ is H or $CH_3$.

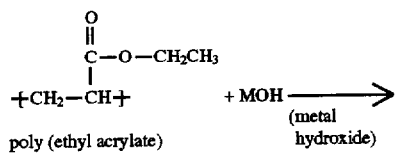

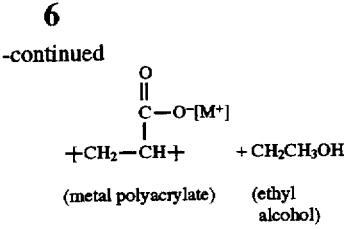

(metal polyacrylate)    (ethyl alcohol)

The metal hydroxide that may be used in the above reactions may vary. Generally, the Group IA metals are well suited for use in the process. Consequently, sodium hydroxide, potassium hydroxide, lithium hydroxide or mixtures thereof are used. Most metal hydroxides are solid in their pure state. In order to facilitate mixing of the metal hydroxides with the polyacrylate emulsion, preferably the metal hydroxide is added in an aqueous solution.

The amount of water added to the metal hydroxide can be determined by the percent solids desired in the final product. According to one embodiment of the present invention, water is added to the process to initially form the aqueous emulsion containing the acrylate ester monomer and is added mixed with the metal hydroxide. Preferably, the total amount of water added in these two steps equals the desired concentration required in the final product. Of course, water can be added or removed after hydrolysis to reach the desired dilution level.

The amount of water and the percent solids present in the final thickener product is an important consideration. Generally, the amount of water added during the process has an effect on the overall viscosity of the final product. In most applications, the thickener produced according to the present invention has a solids level between about 5% to about 20% and most commonly between 8% and 15%. The viscosity of the thickener should be such that the thickener is pumpable and handleable and can be, for instance, between about 1,000 to about 30,000 centipoise as registered on a Brookfield RVT viscometer at 20 RPM. However, the amount of water added during the production of the thickener, although a factor, does not solely determine the final viscosity of the product.

During hydrolysis of the polyacrylate, preferably the polyacrylate and metal hydroxide mixture is maintained at an elevated temperature. Similar to the polymerization reaction described above, during hydrolysis the reactor should be heated to an elevated temperature for speeding up the rate of reaction but at a temperature insufficient to cause any adverse consequences. In one embodiment, it has been discovered that the reactor is preferably maintained at a temperature between about 170° F. to about 200° F., and preferably around 190° F. during hydrolysis. During this step in the process, the temperature should remain below the boiling point of the produced alcohol solvent. In particular, if the temperature was to increase above the boiling point of the alcohol formed during hydrolysis, the product may tend to foam and swell. Of course, higher temperatures may be used if pressure is placed upon the reaction mixture.

Also similar to the polymerization step, hydrolysis of the polyacrylate is exothermic in nature. In particular, it has been found that heat is generated when the polyacrylate emulsion is initially mixed with the metal hydroxide. Consequently, the temperature in the reactor vessel should be at least initially monitored and maintained below the boiling point of the alcohol. As such, the reactor should be equipped with appropriate cooling devices. Also, the polyacrylate emulsion can be cooled prior to addition of the metal hydroxide or the metal hydroxide can be added to the emulsion at a slow rate. Typically, when the polyacrylate and metal hydroxide are combined, initially heat is removed from the reactor and then thereafter the reactor is heated in order to maintain the reactor within the above described temperature ranges.

The amount of the polyacrylate mixture that is hydrolyzed with the metal hydroxide determines or significantly effects many of the physical characteristics of the final thickener product. In particular, the percentage of the polyacrylates that are hydrolyzed has some effect on the final viscosity of the product. However, it is generally unpredictable what the resulting physical properties of the thickener will be when the amount of hydrolysis is varied. In other words, the appearance and consistency of the final product is unpredictable when varying the amount of hydrolysis of the polyacrylate.

Generally, at least about 50 percent of the polyacrylate should be hydrolyzed to realize a benefit and a useful thickener. The actual amount of hydrolysis will depend upon the intended use of the final product and the characteristics that are desired. The amount of hydrolysis in the process of the present invention can be varied by varying the amount of the metal hydroxide that is added to the polyacrylate emulsion. As shown by the above reaction diagrams, for 100% hydrolysis, one mole of metal hydroxide is needed for every mole of polyacrylate repeat unit present within the emulsion.

At approximately 190° F. and at atmospheric pressure, the time it takes for the polyacrylates to completely hydrolyze can vary anywhere from four hours to about twenty four hours depending upon the degree of hydrolysis that is desired and the quantities of the reactants. An effective way of determining the completion of hydrolysis once the metal hydroxides are added to the polyacrylates is to monitor the pH. For instance, when the metal hydroxide is first added, the pH will be high. As the metal hydroxide reacts with the polyacrylates, the pH will then drop and ultimately level out. For example, the pH can initially be around 10 to 11 and once hydrolysis is complete will be between about 8 to about 9.5.

Once hydrolysis is complete, the final product is then cooled and used as desired. The thickening agent of the present invention is particularly well suited for use in textile coatings or other latex based compositions. For instance, the thickening agent may be incorporated into a coating composition used for adhesively securing carpet fibers to a base material. Besides a thickener, these types of textile coatings typically contain fillers, surfactants, and a latex.

Fillers that are used in textile coatings include, for example, various grades of calcium carbonate, clay, dolomite, aluminum trihydrate, magnesium carbonate and mixtures thereof. Fillers can be present in the coatings in an amount up to about 90% by weight and are preferably present in an amount between from about 80% to about 85% by weight. The surfactants included in the textile coatings can be different types of nonionic and anionic surfactants and can be present in the coatings in an amount up to about 5% by weight, and are usually present in an amount of about 1% by weight. Such surfactants can include, for instance, the products 801, 807, 821, 822 and 380A offered commercially by SCT, the products 2050, 2084 and 2101 offered commercially by ChemTex, the products 161, 162, 167A, 167M and 184 offered commercially by Standard Adhesive of Georgia, the products 206, 214, 233A, 245 and 267 offered commercially by Surfactant Systems or the products 234, 8209, 8440 and 8613 offered commercially by Texa Labs. Further information about the commercial availability of these products can be obtained from the assignee of the present invention, Para-Chem Southern, Inc. located in Simpsonville, S.C.

The latex used in the textile coatings can be a styrene-butadiene (SBR), ethylene vinyl acetate (EVA) an acrylic, a styrene acrylic, a vinyl acrylic, a vinyl acetate, a natural rubber, a neoprene rubber, and mixtures thereof. The latex can be present the coating in an amount up to about 95% by weight and preferably is present in an amount of about 10% by weight to about 25% by weight.

To formulate the textile coating, the above described ingredients are merely mixed in the presence of water. Water is added in an amount so that the composition has about a 70% to about 95% solids content. Generally, water is added in an amount of from about 5% to about 10% by weight. A polyacrylate thickener made according to the present invention can then be added in an amount sufficient to reach a target viscosity. Generally speaking, the thickener is added in an amount from about ½% to about 1% by weight but can be added in an amount up to about 10% by weight.

When applied to a textile substrate, these coatings are typically first whipped and mixed with air to form a foam prior to application. The thickener of the present invention facilitates the formation of this foam and also enhances the froth viscosity of the foam. Using the coating product as a foam controls the amount of add on applied to the textile substrate and also facilitates distribution over the substrate.

By using ethyl acrylate as part of the initial monomer blend to produce the thickener of the present invention, many advantages are realized. First, when the ethyl acrylate is polymerized into poly (ethyl acrylate) and then hydrolyzed, ethyl alcohol is formed which remains in the final product. Ethyl alcohol is nontoxic, nonhazardous and presents no health risks. Further, quite unexpectedly, it has been discovered that when using ethyl acrylate, a thickener is produced with enhanced thickening properties. Specifically, when the thickening agent of the present invention is added to a coating composition, the thickening agent is capable of influencing and increasing the viscosity of the coating more effectively than prior art thickeners. Consequently, less thickener is required. Also, when a coating incorporating a thickener made according to the present invention is converted to a foam, the coating has been found to have higher froth viscosities.

More benefits, advantages and aspects of the present invention will be apparent from the following examples.

EXAMPLE 1

For comparative purposes, a polyacrylate thickener made from a methyl acrylate monomer and a polyacrylate thickener made from an ethyl acrylate monomer were prepared. Specifically, the following formulations were used to prepare the two thickeners:

TABLE I

| THICKENER PREPARATIONS | | |
|---|---|---|
| | A (parts) | B (parts) |
| Methyl Acrylate | 99 | 0 |
| Ethyl Acrylate | 0 | 99 |
| Methacrylic Acid | 1 | 1 |
| Water | 650 | 574 |
| Anionic surfactant, Abex 22-S | 11.2 | 11.2 |
| Nonionic surfactant Igepal CO-997 | 1.7 | 1.7 |
| Potassium Persulfate | 0.13 | 0.13 |
| Sodium Hydroxide (50% soln) | 74.4 | 62 |
| Product, % solids | 13% | 13% |

In producing both thickeners A and B above, the acrylic monomer and methacrylic acid were first combined with the water, the surfactants and the persulfate at about 180° F. until complete polymerization occurred. The polyacrylate emulsion formed was cooled and then the sodium hydroxide and water were added. The mixture was heated to about 190° F. until hydrolysis was complete. As shown in the above table, the ratio of sodium hydroxide to acrylate ester was adjusted to give about the same percent hydrolysis.

The formed thickeners were translucent colloidal solutions consisting primarily of a mixture of the acrylate ester polymer and the sodium acrylate polymer.

EXAMPLE 2

Thickener A and thickener B produced in Example 1 above were then added to a textile coating and evaluated. In particular, both thickeners A and B were added to a textile coating comprising a mixture of water, latex polymer, a filler, and a surfactant. The latex polymer was a styrene-butadiene obtained from BASF Corporation, while the filler used was a limestone powder.

Thickener A and thickener B produced in Example 1 were added to the coating composition until a required viscosity range of between 14,000 cps to 15,000 cps was reached. After standing overnight, a measured amount of each sample was then foamed with air using a Kitchen Aid mixer at high speed for three minutes followed by low speed for one minute. The density and viscosity of the foam was then measured. The following results were obtained:

TABLE II

TEXTILE COATING RESULTS

|  | Coating Formed Using Thickener A | Coating Formed Using Thickener B |
| --- | --- | --- |
| Thickener required | 8.65 g. | 8.20 g. |
| Froth Density | 0.4476 g./ml. | 0.4534 g./ml. |
| Froth Viscosity | 24,500 cps | 28,500 cps |

As shown, unexpectedly, the coating formed using thickener B made from ethyl acrylate, required less thickener and yet produced a higher froth viscosity.

These and other modifications and variations to the present invention may be practiced by those of ordinary skill in the art, without departing from the spirit and scope of the present invention, which is more particularly set forth in the appended claims. in addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

We claim:

1. A method of preparing polyacrylate thickeners, said method comprising the steps of:
    polymerizing an acrylate ester monomer blend in an aqueous emulsion, said acrylate ester monomer blend comprising primarily ethyl acrylate, said ethyl acrylate being polymerized to form a poly (ethyl acrylate); and
    hydrolyzing at least a portion of said poly (ethyl acrylate) using a metal hydroxide, said poly (ethyl acrylate) being converted to a metal polyacrylate and ethyl alcohol.

2. A method as defined in claim 1, wherein said aqueous emulsion in which said monomer is polymerized contains a persulfate initiator.

3. A method as defined in claim 2, wherein said aqueous emulsion further comprises an acid stabilizer.

4. A method as defined in claim 1, wherein said aqueous emulsion is maintained at a temperature between about 160° F. and about 195° F. during polymerization.

5. A method as defined in claim 2, wherein said aqueous emulsion further comprises at least one surfactant.

6. A method as defined in claim 1, wherein said metal hydroxide is a material selected from the group consisting of sodium hydroxide, potassium hydroxide, lithium hydroxide, and mixtures thereof.

7. A method as defined in claim 1, wherein from about 50% to about 100% of said polymerized monomer is converted to said metal polyacrylate.

8. A method as defined in claim 1, wherein said polymerized monomer is hydrolyzed at a temperature between about 170° F. to about 200° F.

9. A method as defined in claim 1, wherein said resulting thickener has a solids content between from about 5% to about 20%.

10. A method of preparing polyacrylate thickeners, said method comprising the steps of:
    blending an acrylate ester monomer with a polymerization initiator in an aqueous emulsion, said acrylate ester monomer comprising primarily ethyl acrylate;
    heating said aqueous emulsion to a temperature sufficient to cause said acrylate ester monomer to polymerize, said temperature being maintained below the boiling point of said monomer, said ethyl acrylate being converted to a poly (ethyl acrylate); and
    combining said aqueous emulsion with a predetermined amount of a metal hydroxide sufficient to hydrolyze at least a portion of said poly (ethyl acrylate), said portion of said poly (ethyl acrylate) being converted to ethyl alcohol and a metal polyacrylate, said metal hydroxide being combined with said aqueous emulsion at a temperature sufficient to cause said poly (ethyl acrylate) to hydrolyze but at a temperature insufficient to vaporize said formed ethyl alcohol.

11. A method as defined in claim 10, wherein said polymerization initiator is a material selected from the group consisting of potassium persulfate, sodium persulfate, ammonium persulfate and mixtures thereof.

12. A method as defined in claim 10, wherein said aqueous emulsion contains an acid stabilizer, said acid stabilizer comprising a material selected from the group consisting of acrylic acid, methacrylic acid and mixtures thereof.

13. A method as defined in claim 10, wherein, during polymerization of said acrylate ester monomer, said aqueous emulsion is maintained at a temperature between about 160° F. to about 195° F.

14. A method as defined in claim 10, further comprising the step of adding a finishing initiator to said aqueous emulsion after an majority of said acrylate ester monomer has polymerized, said finishing initiator comprising ammonium persulfates.

15. A method as defined in claim 10, wherein from about 50% to about 100% of said poly (ethyl acrylate) is hydrolyzed with said metal hydroxide.

* * * * *

REEXAMINATION CERTIFICATE (4163rd)

United States Patent [19]
Ungefug et al.

[11] B1 5,703,176
[45] Certificate Issued Oct. 3, 2000

[54] POLYACRYLATE THICKENER AND METHOD FOR MAKING SAME

[75] Inventors: Gary Allan Ungefug, Simpsonville; Benjamin Marvin Wicker, Ware Shoals; James Richard Bible, Fountain Inn, all of S.C.; Billy Thomas Worley, Jr., Dalton, Ga.

[73] Assignee: Para-Chem Southern, Inc., Simpsonville, S.C.

Reexamination Request:
No. 90/005,620, Jan. 26, 2000

Reexamination Certificate for:
Patent No.: 5,703,176
Issued: Dec. 30, 1997
Appl. No.: 08/620,852
Filed: Mar. 18, 1996

[51] Int. Cl.$^7$ ....................................................... C08F 8/42

[52] U.S. Cl. ......................................... 525/369; 525/330.6
[58] Field of Search ............................................... 525/369

[56] References Cited

U.S. PATENT DOCUMENTS 4,916,183  4/1990  Barron et al. .

*Primary Examiner*—Bernard Lipman

[57] ABSTRACT

An improved polyacrylate thickener and a method for making same are provided. The polyacrylate thickener is made using a monomer blend containing ethyl acrylate. In one embodiment the ethyl acrylate is polymerized and then hydrolyzed using a metal hydroxide. The resulting thickener contains unhydrolyzed polyacrylates, metal polyacrylates and ethanol. The final product, which is nontoxic and nonhazardous, can then be added to other compositions, such as textile coatings, as a viscosity enhancer.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–15 is confirmed.

* * * * *